Oct. 23, 1928.
A. G. ANDREWS
1,688,846
COLANDER STRAINER
Filed Oct. 17, 1927
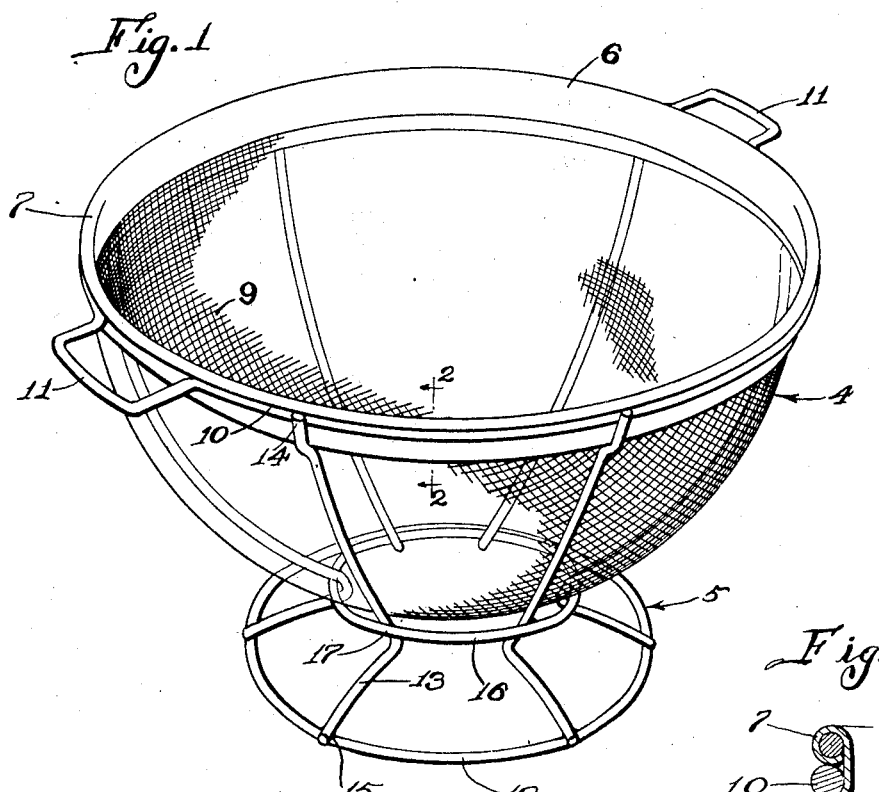
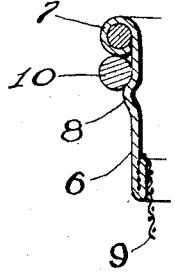
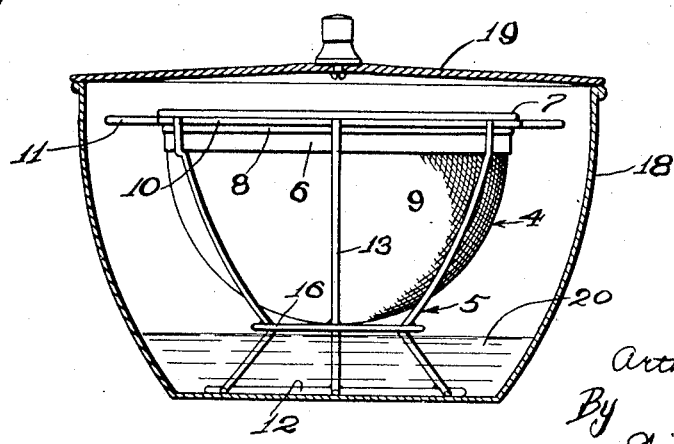
Inventor
Arthur G. Andrews
By Wilson & McCanna
Atty's Patented Oct. 23, 1928.

1,688,846

UNITED STATES PATENT OFFICE.

ARTHUR G. ANDREWS, OF ROCKFORD, ILLINOIS, ASSIGNOR TO THE WASHBURN COMPANY, OF WORCESTER, MASSACHUSETTS, A CORPORATION OF MASSACHUSETTS.

COLANDER STRAINER.

Application filed October 17, 1927. Serial No. 226,617.

This invention relates to kitchen utensils and more particularly a colander-strainer.

Colanders, as ordinarily known, are made of perforated sheet metal and by reason of such construction have a limited range of usefulness. That is, they can be used only for draining cooked vegetables, washing fruits, etc., and to a limited extent as a strainer. In accordance with the present invention I have provided a colander made up of a screen bowl and a wire base or holder, and have found that this utensil, while capable of practically all of the uses of the ordinary type of colander, is more efficient in certain kinds of work as, for example, in washing berries, green peas, beans, rice, etc., and, more important still, takes the place of a double boiler since it is capable of use as a steamer by placing the same inside of a kettle in the case of steaming rice or other foods.

The invention is illustrated in the accompanying drawing in which—

Figure 1 is a perspective view of a colander-strainer made as herein described;

Fig. 2 is an enlarged sectional detail on the line 2—2 of Fig. 1; and

Fig. 3 is a view showing the use of the utensil as a steamer.

The utensil comprises a bowl 4 of wire screen construction and a base or holder 5 of wire construction. The bowl 4 is suitably circular and has a sheet metal rim 6 which is rolled at its upper edge, as at 7, and beaded slightly below the upper edge, as at 8. The cupped screen 9, which is preferably of fairly coarse gauge, is fastened to the rim 6 at the lower edge thereof in the usual manner. The bowl fits snugly but removably in the holder 5, the upper ring 10 of the wire frame comprising the holder having the rim 6 fitting neatly therein up to the rolled edge 7, the ring being arranged to snap into place over the bead 8 in the manner shown in Fig. 2 whereby to retain the bowl against accidental displacement from the holder. Handles 11 are provided on the ring 10 by loops bent in the wire of the ring at diametrically opposite sides thereof in a forming operation. The ring 10 is contracted to such an extent in the forming of the handles 11 that the ring 10, in order to pass over the bead 8, has to rely on a slight amount of expansion afforded by the resilience of the wire in the handles 11. The ring 10, therefore, firmly grips the bowl. The holder has a bottom or base ring 12 joined with the upper ring 10 by wire ribs 13 suitably spot-welded or otherwise secured to the two rings at the points 14 and 15. The wires 13 are suitably arched to conform to the shape of the screen bowl and are joined together by an intermediate concentration ring 16 spot-welded thereto at the points 17, thus making for the desired strength and rigidity.

In use, it will be observed that the pedestal-like base of the holder supports the bowl elevated sufficiently for the purposes of draining, as, for example, when cooked vegetables like spinach, squash, beets, beans, cauliflower, cabbage, potatoes, carrots, peas, etc., are poured into the bowl or when vegetables and dried or fresh fruits, berries, etc., are being washed therein. The elevated position of the bowl is, of course, an equal necessity where the utensil is used for straining, as, for example, straining grapes, currants, and all sorts of jellies, soups, etc., or where the utensil may be put to the service of a sink strainer. Principally however, attention is called to a novel use depicted in Fig. 3 where the utensil has been placed in a kettle 18 closed by a lid 19 and containing water to the depth indicated at 20, as for example when steaming rice, macaroni, spaghetti or other foods. The elevated support keeps the rice above the water and the screen bowl allows practically unrestricted passage for the steam through the batch of rice or other food in the bowl so that the latter is steamed thoroughly and much more efficiently than the operation could be performed in a double boiler. The removability of the bowl is obviously of advantage in washing the same and might also prove to be of advantage in certain cases where it might be desired to use the bowl alone, as, for example, simply as a sieve.

It will, therefore, appear that I have provided a utensil of the type referred to, which, by reason of the novel construction described, performs the functions of the ordinary kind much more efficiently and, furthermore, is capable of additional uses, besides being of a very simple, economical, and durable construction.

I claim:

1. A colander-strainer comprising a screen bowl, and a support for said bowl of skeleton construction comprising a top ring fitting about the rim of the bowl for support thereof, a bottom ring appreciably below the bottom of the bowl, and ribs extending from the top ring to the bottom ring and secured to both, each of said ribs being bent inwardly in a curve from the top ring substantially to fit the outside of the bowl and serve as a support therefor and having the lower end bent outwardly to the bottom ring whereby to provide a broad pedestal base for adequate stability of the device.

2. A colander-strainer comprising a wire frame of skeleton construction providing a supporting ring, the same having one or more handles provided by looped portions extending outwardly therefrom, and a screen bowl arranged to fit removably in said frame having a sheet metal rim arranged to be frictionally engaged in said supporting ring, the latter being slightly contracted in diameter in the forming of said looped portions but being expansible by reason of the resilience in the wire of the looped portions whereby the rim of the bowl is arranged when entered in said ring to expand the same so that the bowl is held frictionally due to the resilience of said looped portions.

3. A strainer as set forth in claim 1 including a concentration ring between the top and bottom rings connected to the ribs where the latter are bent outwardly toward the bottom ring, whereby all of said ribs are rigidly fastened together to form a rigid support and are firmly held against lateral displacement out of operative relation to the bowl.

4. A utensil of the character described comprising a wire frame of skeleton construction providing a supporting ring, and a screen bowl arranged to fit removably in the wire frame, said bowl having a sheet metal ring forming the rim thereof, the upper edge of said ring being rolled and said ring being beaded slightly beneath the rolled edge, and the ring being arranged to fit within the wire ring of the frame with the rolled edge seating on the top of the wire ring and the bead engaging the wire ring on the under side of the latter so that the bowl is removably retained in place.

5. A utensil as set forth in claim 4 wherein the wire ring has one or more handles provided by looped portions, the wire ring being slightly contracted in diameter in the forming of said looped portions but being expansible by reason of the resilience in the wire of the looped portions in order to ride over the bead on the sheet metal ring forming the rim of the bowl substantially as described.

In witness of the foregoing I affix my signature.

ARTHUR G. ANDREWS.